(No Model.)
A. S. PHILLIPS.
COMBINED YARDSTICK AND BIAS RULE.
No. 263,351. Patented Aug. 29, 1882.
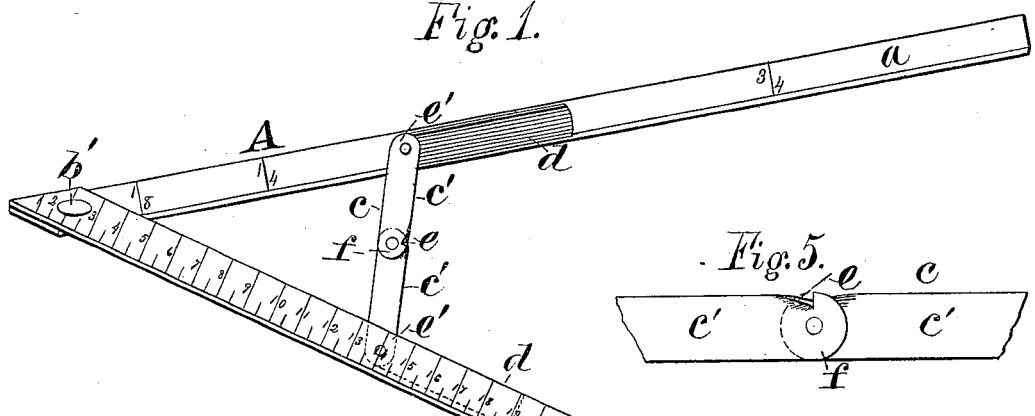
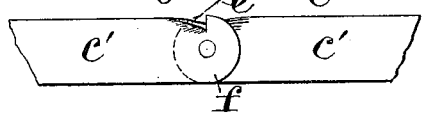
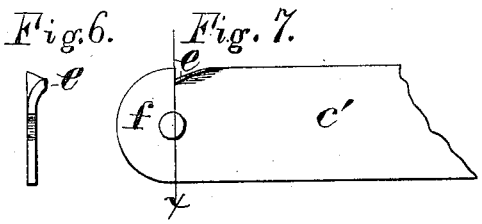
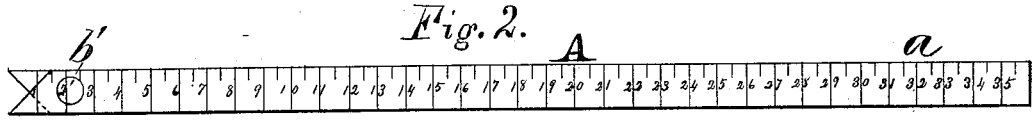
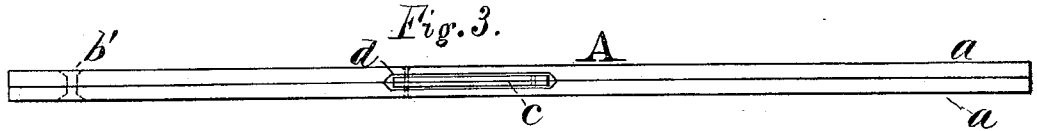
Attest.
M. M. Converse
G. M. Gridley
Inventor:
Anna S. Phillips.
B. L. Converse, Atty.
N. PETERS. Photo-Lithographer, Washington, D. C.

UNITED STATES PATENT OFFICE.

ANNA S. PHILLIPS, OF SPRINGFIELD, OHIO.

COMBINED YARD-STICK AND BIAS-RULE.

SPECIFICATION forming part of Letters Patent No. 263,351, dated August 29, 1882.

Application filed April 27, 1882. (No model.)

*To all whom it may concern:*

Be it known that I, ANNA S. PHILLIPS, of the city of Springfield, in the county of Clarke and State of Ohio, have invented a new and useful Improvement in a Combined Cloth-Marker and Yard-Stick, of which the following is a full, clear, and exact specification, reference being had to the drawings hereto annexed.

My invention relates to a combined cloth-marker and yard-stick.

My invention relates to an instrument which may be used as a yard-stick for measuring cloth when folded together, and which can be used when unfolded for marking cloth on the bias, so that it can be cut accurately without waste.

The object of my invention is to produce a neat, simple, convenient, and cheap instrument which may be used for measuring and marking cloth a true bias, so that there shall be no waste of the same when cut; also for measuring and marking goods straight in the same manner, and which may be folded in a compact form, so as to be used as a yard-stick, and which will be useful not only for retail dry-goods merchants, but also for dress-makers and in families making their own clothing.

Figure 1 is an isometric view of my combined cloth-marker and yard-stick, or "bias-rule and yard-stick," as it may be called. Fig. 2 is a top view of the same instrument when folded up to be used as a yard-stick for measuring lengths of cloths. Fig. 3 is an edge view of the folded instrument shown in Fig. 2. Fig. 4 is an edge view of the joint and a portion of each of the two sections of the hinged brace by which the two primary members of the instrument are connected. Fig. 5 is a top view of the same. Fig. 6 is a cross-section of one of the limbs of the brace through line *x*, Fig. 7. Fig. 7 is an enlarged top view of the hinge end of one of the limbs of the hinged brace.

In the drawings, A is the combined cloth or bias rule and yard-stick. It consists of two yard-sticks cut at one end to form an angle of forty-five degrees (when the instrument is opened, as seen in Fig. 1) and the end of one lapped upon the other and hinged together by a rivet, *b'*, so that they can be folded easily upon each other, as seen in Fig. 2. A brace, *c*, having a peculiar hinge-joint in the middle, connects the two limbs *a* and *a* of the instrument together, so that when it is unfolded, as seen in Fig. 1, this brace will allow the two limbs to stand at an angle of forty-five degrees with each other. Brace *c* is made of sheet metal and has a stop-hinge formed at its middle connecting ends. The ends are rounded, lapped upon each other, and pivoted by a rivet. On the rear edge of the joint, opposite the central line of the pivot, a slit is cut in the edge of each of the limbs *c'*, and the angle formed by this slit upon the body part, as seen at *e*, is turned back in opposite directions. This forms a substantial and complete stop for the hinge when opened, as seen in Figs. 1, 4, and 5. Besides operating against each other as stops, the turned angles *e*, as they pass under the edge of the head *f* on each one, spring it slightly, so as to tighten the surfaces of the body part of *c'* and *c'* together, the brace being folded into the slot seen in Fig. 3, formed by the two opposite recesses *d*, which are cut out of the contacting surfaces of each of the two limbs *a* and *a* to form this slot to receive the hinged brace *c*. This brace has the extreme ends also rounded and pivoted in the upper end, *e'*, of each of the recesses *d*. The rounded ends of the brace fit closely into the rounded ends of the recess *d*, so as to give this end of the brace a bearing against the wall of the recess to resist any end pressure upon the brace in folding up the instrument. The recess *d* is cut deep enough to admit the brace-limb *c'* on each of the sticks *a*, (being flat on the bottom,) and is cut far enough across to receive the width of the brace and leave a portion of the stick to form a wall on one edge, so that when the yard-stick is folded the brace *c* is concealed, and can only be seen from one edge of the folded stick, as shown in Fig. 3. In this form the yard-stick has no more external projections than is seen in a common single yard-stick and can be used equally as well. It will be noticed that the bent-up angles *e* are formed upon that edge of the brace *c* which folds back into the innermost part of recess *d* or bottom of the slot formed by the two recesses when the stick is folded, so that only the smooth edge of the folded brace is seen in the view Fig. 3. Brace *c* opens in exactly the opposite direction from the primary members

*a*, connected at the main joint by the rivet *b'*. By thus reversing the hinge of the brace a premature closing of the instrument is prevented, and the position (when extended) of the limbs *a* better retained where there is any inward pressure upon their free ends in handling the same. The two sticks or limbs have each upon one side a scale of feet and inches and upon the other fractional parts of a yard, so as to allow the instrument to be reversible. They are cut at their connecting ends so as to form an even edge and a true angle where they lap upon each other, and are pivoted in the central line so as to exactly cover each other when folded. By preference a rivet and washer is used, though other forms of making this joint may be used.

I am aware that triangular frames have been used for marking cloth bias, and that triangular squares have also been used; also that complex frames with adjustable arms have been before made and used; but I do not claim these as any part of my invention.

I claim as my invention—

1. A combined bias-rule and yard-stick having its two limbs hinged or pivoted together at the angle and adapted to be folded upon each other, as shown, and connected between their angle and free ends by a brace attached by its ends to stationary pivots on said limbs, which are held rigidly in place when the brace is set, substantially as described.

2. In a combined cloth-marker or bias-rule and yard-stick, the two limbs or sticks *a a*, overlapping each other at their connecting ends, and pivoted or hinged at the angle of connection by a rivet, *b'*, and each provided with a recess, *d*, on their overlapping surfaces opposite to the other, said recesses forming a slot when the instrument is folded, into which the hinged brace *c*, connecting the two limbs, folds down so as to be concealed from view, substantially as and for the purpose hereinbefore set forth.

3. In an instrument convertible from a bias-rule or cloth-marker to a yard-stick, and adapted to be folded together for the purpose of changing its use in the manner shown, the combination, with the two yard-sticks pivoted or hinged together at one end, of the hinged brace pivoted thereto and the approximating recesses in the lapping surfaces for receiving the same to conceal it from view when the instrument is folded together, as hereinbefore set forth.

4. A combined bias-rule and yard-stick consisting of two pivoted or hinged limbs adapted to be folded upon each other, and having corners beveled substantially as shown, and a brace placed between the angle and free ends, for holding the limbs upon the same angle as the beveled corners, for the purpose set forth.

5. In a combined bias-rule and yard-stick, a brace formed of two sections pivoted together, and having ears or stops *e*, substantially as described, and for the purpose set forth.

ANNA S. PHILLIPS.

Attest:
B. C. CONVERSE,
JOHN H. DRISCOL.